(12) United States Patent
Halder et al.

(10) Patent No.: US 9,064,352 B2
(45) Date of Patent: Jun. 23, 2015

(54) POSITION IDENTIFICATION SYSTEM WITH MULTIPLE CROSS-CHECKS

(71) Applicant: Caterpillar Inc., Peoria, IL (US)

(72) Inventors: Bibhrajit Halder, Peoria, IL (US);
Andrew Whitten, Dunlap, IL (US);
Joshua Struble, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 219 days.

(21) Appl. No.: 13/869,063

(22) Filed: Apr. 24, 2013

(65) Prior Publication Data

US 2014/0324300 A1    Oct. 30, 2014

(51) Int. Cl.
G01C 21/12        (2006.01)
G07C 3/00         (2006.01)
G01S 19/47        (2010.01)

(52) U.S. Cl.
CPC .. *G07C 3/00* (2013.01); *G01S 19/47* (2013.01)

(58) Field of Classification Search
CPC ................................. G07C 3/00; G01S 19/47
USPC .......... 701/23, 400, 445, 466, 469, 472, 495, 701/500; 455/456.1, 456.6
See application file for complete search history.

(56) References Cited

U.S. PATENT DOCUMENTS

| | | | | |
|---|---|---|---|---|
| 5,394,333 | A * | 2/1995 | Kao | 701/445 |
| 5,752,220 | A * | 5/1998 | Geier | 701/495 |
| 5,938,704 | A * | 8/1999 | Torii | 701/23 |
| 6,125,325 | A * | 9/2000 | Kohli | 701/466 |
| 8,180,379 | B2 * | 5/2012 | Forstall et al. | 455/456.6 |
| 2001/0029409 | A1 | 10/2001 | Tiede et al. | |
| 2007/0299603 | A1 * | 12/2007 | Kirby et al. | 701/207 |
| 2010/0079334 | A1 | 4/2010 | Roh et al. | |
| 2010/0088064 | A1 | 4/2010 | Lund et al. | |
| 2010/0211316 | A1 | 8/2010 | Da Silva et al. | |

(Continued)

FOREIGN PATENT DOCUMENTS

| | | |
|---|---|---|
| JP | 2000-264830 | 10/2000 |
| KR | 10-2007-0021812 | 2/2007 |

(Continued)

OTHER PUBLICATIONS

PCT Search Report dated Aug. 18, 2014.

*Primary Examiner* — Mary Cheung
(74) *Attorney, Agent, or Firm* — Finnegan, Henderson, Farabow, Garrett & Dunner, LLP

(57) ABSTRACT

A position identification system for use with a mobile machine at a worksite is disclosed. The system may include an integration module configured to integrate information from at least one motion sensor and at least one GPS receiver to generate a location signal indicative of an actual location of the mobile machine. A controller may be provided in communication with the at least one motion sensor, the at least one GPS receiver, and the integration module, the controller being configured to determine the reliability of information received from the at least one motion sensor, the at least one GPS receiver, and the integration module, and following a period of time from when received information is first determined to be unreliable, switching from determining the position of the mobile machine using information determined to be unreliable to determining the position of the mobile machine using dead reckoning from a last known good position of the mobile machine, a determined wheel speed of the mobile machine, and a steering command being provided to the mobile machine.

22 Claims, 3 Drawing Sheets

(56) References Cited

U.S. PATENT DOCUMENTS

2010/0332135 A1    12/2010  Toda
2011/0117924 A1*    5/2011  Brunner et al. ............ 455/456.1
2011/0254729 A1    10/2011  Dutta et al.
2013/0261964 A1*   10/2013  Goldman et al. ............ 701/500

FOREIGN PATENT DOCUMENTS

KR    10-2011-0132278    12/2011
WO    WO 2011/160213    12/2011

* cited by examiner

POSITION IDENTIFICATION SYSTEM WITH MULTIPLE CROSS-CHECKS

TECHNICAL FIELD

The present disclosure relates generally to a position identification system, and more particularly, to a position identification system with multiple cross-checks.

BACKGROUND

Worksites, for example, mine sites, landfills, quarries, construction sites, etc., commonly undergo geographic alteration by machines performing various tasks thereon. For example, at a coal mining site, mounds of coal are continually moved by dozers about the site, onto conveyors, into chutes, and to prepare the coal for transport. Likewise, at an excavation site, terrain is altered by digging, grading, leveling, or otherwise preparing the terrain for various uses. During the performance of these tasks, the machines can operate in situations that are hazardous to an operator, under extreme environmental conditions, or at work locations remote from civilization. Accordingly, autonomous or semiautonomous machines are often utilized.

In order to achieve autonomy, a machine must be able to accurately determine its position relative to its environment at all times. The positioning of a mobile machine, such as earth moving equipment, mining equipment, and railroad equipment is commonly achieved using known reference-based systems, such as the Global Navigation Satellite Systems (GNSS). The GNSS comprises a group of satellites that transmit encoded signals, and receivers on the ground. The receivers may use trilateration techniques to calculate their position using the travel time of the satellites' signals and information about the satellites' current location.

Currently, the most popular form of GNSS for obtaining absolute position measurements is the global positioning system (GPS), which is capable of providing accurate position information provided that there is sufficient satellite coverage. However, where the satellite signal becomes disrupted or blocked such as, for example, in urban settings, tunnels and other GNSS-degraded or GNSS-denied environments, a degradation or interruption or "gap" in the GPS positioning information can result.

In order to achieve more accurate, consistent and uninterrupted positioning information, GNSS information may be augmented with additional positioning information obtained from complementary positioning systems. Such systems may be self-contained and/or "non-reference based" systems within the platform, and thus need not depend upon external sources of information that can become interrupted or blocked. One such "non-reference based" or relative positioning system is the inertial navigation system (INS). Inertial sensors are self-contained sensors within the platform that use gyroscopes to measure the platform's rate of rotation/angle, and accelerometers to measure the platform's specific force (from which acceleration is obtained). Using initial estimates of position, velocity and orientation angles of the moving platform as a starting point, the INS readings can subsequently be integrated over time and used to determine the current position, velocity and orientation angles of the platform. Typically, measurements are integrated once for gyroscopes to yield orientation angles and twice for accelerometers to yield position of the platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors.

An exemplary system that provides position monitoring is disclosed in U.S. Pat. No. 7,831,362 issued to Ishibashi et al. on Nov. 9, 2010 ("the '362 patent"). Specifically, the '362 patent discloses a machine equipped with a GPS system for measuring the location of the machine's body. Sometimes, however, the GPS measurement of the machine body's location is inaccurate. As such, the '362 patent also discloses a reference GPS that may be located away from the machine to provide measurements that may be used to correct the other GPS measurements.

Although the '362 patent may account for inaccuracies in a GPS measurement of a machine, it does not address possible inaccuracies in the location of the reference GPS, or inaccuracies in the output from the reference GPS. The sensors may also malfunction under harsh worksite conditions and render the '362 system unable to correct location inaccuracies and provide accurate position information for autonomous control of the machine.

The disclosed system for determining the position of a mobile machine is directed to overcoming one or more of the problems set forth above and/or other problems of the prior art.

SUMMARY

In one aspect, the present disclosure is directed to a system for determining the position of a mobile machine. The system may include at least one motion sensor configured for detecting one or more of changes in position, velocity, acceleration, heading, wheel speed, rotation, steering angle, or orientation of the mobile machine. The system may also include at least one global positioning system (GPS) receiver in addition to the at least one motion sensor, and the at least one GPS receiver may be configured to generate a first location signal indicative of an actual location of the mobile machine. An integration module may be provided and configured to integrate information from the at least one motion sensor and the at least one GPS receiver to generate a second location signal indicative of an actual location of the mobile machine. A controller may be provided in communication with the at least one motion sensor, the at least one GPS receiver, and the integration module. The controller may be configured to determine the reliability of information received from the at least one motion sensor, the at least one GPS receiver, and the integration module, and following a period of time from when received information is first determined to be unreliable, switching from determining the position of the mobile machine using information determined to be unreliable to determining the position of the mobile machine using dead reckoning from a last known good position of the mobile machine, a determined wheel speed of the mobile machine, and a steering command being provided to the mobile machine.

In another aspect, the present disclosure is directed to a method of checking the position of a mobile machine. The method may include receiving first signals indicative of one or more of changes in position, velocity, acceleration, heading, wheel speed, rotation, steering angle, or orientation of the mobile machine from one or more motion sensors, and receiving second signals indicative of an actual location of the mobile machine from at least one global positioning system (GPS) receiver in addition to said one or more motion sensors. The method may further include integrating information from the one or more motion sensors and the at least one GPS receiver using an integration module to generate an integrated location signal indicative of an actual location of the mobile machine. The method may include determining the reliability of information received from the one or more motion sensors, the at least one GPS receiver, and the integration module, and switching from determining the position of the mobile machine using information determined to be unreliable to determining the position of the mobile machine using dead reckoning from a last known good position of the mobile machine, a determined wheel speed of the mobile machine, and a steering command being provided to the mobile machine following a period of time from when received information is first determined to be unreliable.

In yet another aspect, the present disclosure is directed to a computer readable medium having executable instructions stored thereon for performing a method of checking the position of a mobile machine. The method may include receiving first signals indicative of one or more of changes in position, velocity, acceleration, heading, wheel speed, rotation, steering angle, or orientation of the mobile machine from one or more motion sensors, receiving second signals indicative of an actual location of the mobile machine from at least one global positioning system (GPS) receiver in addition to the one or more motion sensors, and integrating information from the one or more motion sensors and the at least one GPS receiver using an integration module to generate an integrated location signal indicative of an actual location of the mobile machine. The method may further include determining the reliability of information received from the one or more motion sensors, the at least one GPS receiver, and the integration module, and switching from determining the position of the mobile machine using information determined to be unreliable to determining the position of the mobile machine using dead reckoning from a last known good position of the mobile machine, a determined wheel speed of the mobile machine, and a steering command being provided to the mobile machine following a period of time from when received information is first determined to be unreliable.

DETAILED DESCRIPTION

Figure 1:
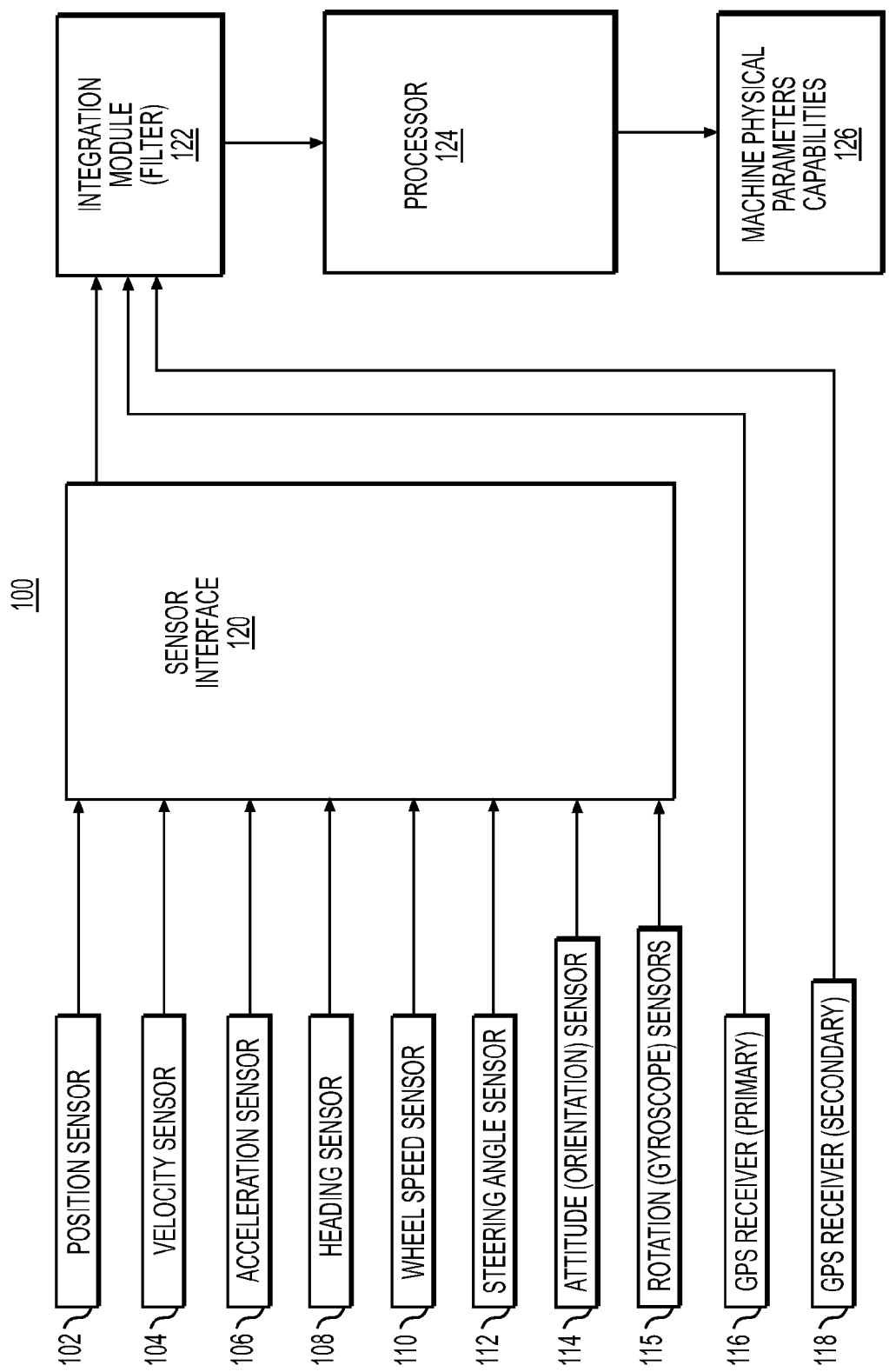
FIG. 1 is a block diagram of an exemplary disclosed position identification system.

FIG. 1 is a high level block diagram showing an exemplary position identification system 100. The position identification system may include a plurality of inertial and machine motion sensors that may form at least part of an inertial navigation system (INS). The INS may be provided as a separate system that may include a computer or controller, motion sensors such as accelerometers, and rotation sensors such as gyroscopes, which continually calculate the position, orientation, and velocity of the mobile machine without the need for external references. Alternatively, or in addition, at least some of the sensors may be independent from the INS, and may be provided for use in identifying a position of a mobile machine through dead reckoning completely independently from dead reckoning that may be performed by the INS. Dead reckoning (DR) is the process of calculating the current position by using a previously determined position, or fix, and advancing that position based upon known or estimated speeds, over an elapsed period of time, and over a particular course. The plurality of inertial and machine motion sensors may include a position sensor 102, a velocity sensor 104, an acceleration sensor 106, a heading sensor 108, a wheel speed sensor 110, a steering angle sensor 112, an attitude or orientation sensor 114, and a rotation or gyroscopic sensor 115. Wheel speed sensor 110 may be used in combination with steering angle sensor 112 to determine a current position of a mobile machine through DR from a last known good position, or a known initial starting position.

At least a primary global positioning system (GPS) receiver 116 and a secondary GPS receiver 118 may also be provided as part of a global navigation satellite system (GNSS), which may be combined or integrated with the INS for position identification system 100. GPS receivers 116 and 118 may be in communication with a constellation of satellites, and may receive signals indicative of the actual location of each GPS receiver from the satellites. Signals output by each of the motion sensors may be provided to a sensor interface 120, and then may be selectively provided to an integration module 122 along with signals output by GPS receivers 116, 118. Integration module 122 may include a Kalman filter. A Kalman filter is an efficient recursive filter that estimates the state of a dynamic system from a series of incomplete and possibly noisy measurements. For example, information about the location, speed and acceleration of the mobile machine may be measured by one or more of the machine motion sensors or the GPS receivers with some corruption by noise at any instant of time. The Kalman filter exploits the dynamics of the mobile machine, which govern the time evolution of its exact position, to remove the effects of the noise and get a good estimate of the location of the mobile machine at the present time (filtering), at a future time (prediction), or at a time in the past (interpolation or smoothing). The Kalman filter is a pure time domain filter, in which only the estimated state from the previous time step and the current measurement are needed to compute the estimate for the current state. In contrast to batch estimation techniques, no history of observations and/or estimates are required. The state of the filter is represented by two variables: (1) the estimate of the state at time k; and (2) the error covariance matrix (a measure of the estimated accuracy of the state estimate). The Kalman filter has two distinct phases: Predict and Update. The Predict phase uses the estimate from the previous time step to produce an estimate of the current state. In the Update phase, measurement information from the current time step is used to refine this prediction in an attempt to arrive at a new, more accurate estimate.

Position identification system 100 may also include a single or multiple controllers 124, field programmable gate arrays (FPGAs), digital signal processors (DSPs), or other components for affecting an operation of a mobile machine. Numerous commercially available processors can be configured to perform the functions of various implementations of this disclosure. Various other known circuits may be associated with position identification system 100, including power supply circuitry, signal-conditioning circuitry, actuator driver circuitry (i.e., circuitry powering solenoids, motors, or piezo actuators), and communication circuitry. Controller 124 may be further configured to provide the architecture for a position interface module (PIM). The PIM may perform various cross-checks for consistency between information provided by external position and orientation systems (POS) and information received, or calculated based on information received from various inertial and machine motion sensors. At least some of the sensors illustrated in FIG. 1 may be included as part of an external POS, which may include integrated GNSS and INS employing Real Time Kinematic (RTK) satellite navigation. In various implementations of this disclosure, one of ordinary skill in the art will recognize that at least some of the various inertial and machine motion sensors, GPS receivers, and the integration module with Kalman filter may be provided entirely, or partially within an external position and orientation system (POS), with data output from the POS being provided to controller 124 and its PIM for cross-checking of integrated GNSS/INS data against GNSS only data produced independently by GPS receivers that are part of position identification system 100.

RTK satellite navigation is a technique used to enhance the precision of position data derived from satellite-based positioning systems, being usable in conjunction with GPS and other systems. The enhancement in precision provided by RTK is the result of the GPS receivers using the much higher frequency carrier wave of the satellite signals, rather than the lower frequency encoded navigation signals provided with the satellite signals. GPS receivers determine the distance from the satellite to the receiver by determining the time delay needed to align an internally generated version of a binary sequence that is also contained in the signal from the satellite. The much higher frequency carrier wave allows for much greater precision in alignment of an internally generated signal at the receiver with the signal received from the satellite. The carrier waves can be difficult to align though without a way to verify that the receiver is attempting to align the correct phase of the carrier wave. RTK systems use at least one base station receiver and a number of mobile unit receivers. This arrangement allows the at least one base station receiver to re-broadcast the phase of a carrier wave that it measures, typically using a radio modem in the ultra-high frequency (UHF) range, to each of the mobile unit receivers. The mobile unit receivers can then verify their own phase measurements for the high frequency carrier wave from the satellite by comparing with similar measurements received by radio wave from the base station receiver. RTK satellite navigation techniques allow for a very precise determination of the moment-by-moment position of each mobile unit receiver relative to the at least one base station receiver. In the exemplary implementation of FIG. 1, primary GPS receiver 116 may be utilized as the base station receiver, or alternatively, an additional base station GPS receiver (not shown) may be provided at a known location or benchmark. The frequency at which position information may be provided by each of primary GPS receiver 116 and secondary GPS receiver 118 in the exemplary implementation of FIG. 1 may be different from the frequency at which updated position information is provided from integration module 122. Additionally, the frequency of integrated GNSS/INS location information provided to the PIM of controller 124 from an external POS may be different from the frequency of position information output by GPS receivers 116, 118. Interpolation or extrapolation of intermediate positions of the mobile machine may therefore be performed by controller 124 to enable consistency checks between information received at different frequencies. The interpolation or extrapolation may be performed by using dead reckoning (DR) with data provided by various sensors such as wheel speed sensor 110 and steering angle sensor 112.

In the exemplary implementation illustrated in FIG. 1, controller 124 may be configured to receive information from integration module 122, and also from various other sources of information such as a database 126 of information regarding the mobile machine's physical parameter capabilities. These machine capabilities may include maximum attainable position, velocity, acceleration, heading, wheel speed, steering angle, orientation (such as pitch, roll, and yaw), and rates of change of these various physical parameters. The reliability of information received from any of the various sources of information associated with position location system 100 may be determined in accordance with various implementations of this disclosure by cross-checking motion or location signals generated by different ones of the various inertial or machine motion sensors, GPS receivers, and/or integration module. As discussed above, integration module 122 may provide output to controller 124 that is an integration of data provided by GPS receivers 116, 118 and data provided by various inertial or machine motion sensors. In various alternative implementations external position and orientation systems (POS) may also combine data from GNSS and INS, and this integrated information may be provided to controller 124 through the position interface module (PIM) of controller 124. Additionally or in the alternative, controller 124 may be configured to perform the cross-checking of information between information received from any one of the various sensors, GPS receivers, and/or integration module and known maximum attainable physical parameters or capabilities of the mobile machine under consideration.

Because the actual physical locations of the various inertial or machine motion sensors, the GPS receivers, and any external POS providing integrated GNSS/INS data will be different, controller 124 may also be configured to account for the spacings between the various sources of data (referred to as lever arm error). In one possible implementation of this disclosure, the POS with integrated GNSS/INS data output may be located on one side of the roof of a mobile machine, a primary GPS receiver may be located on a different side of the roof of the mobile machine, a secondary GPS receiver may be located in yet another position on the roof of the mobile machine, various inertial sensors may be located near the center of gravity of the mobile machine, and a wheel speed sensor may be located in proximity to one of the wheels of the mobile machine. One of ordinary skill in the art will recognize that there may be many different mounting positions for the various sensors, and the lever arm error between the sensors may be accounted for by controller 124 in order to provide location data that can be compared to each other. The various solutions to the position of the mobile machine provided by the various sensors, GPS receivers, and GNSS/INS sources of information may also be mathematically rotated and translated using the known lever arms and attitude data provided by pitch, roll, and yaw sensors. Controller 124 may be configured to perform the cross-checking between the various sources of position information by comparing a difference between measurements, or calculations based upon measurements, to a threshold value. For example, controller 124 may be configured to determine the reliability of information by cross-checking at least one of an X coordinate, a Y coordinate, and a Z coordinate determined for a location of the mobile machine by at least one GPS receiver 116, 118 against a corresponding X coordinate, Y coordinate, or Z coordinate determined for the location of the mobile machine by a different one of GPS receivers 116, 118, integration module 122, or integrated GNSS/INS data provided by a POS.

Controller 124 may be configured to set various restrictions or inhibit conditions on the processing of information received from the various inertial or motion sensors, GPS receivers 116, 118, integration module 122, or GNSS/INS data received from a POS. For example, controller 124 may be configured to perform a maximum position shift check on position information received from any of the various sources. The maximum position shift check may help to ensure that the position determined by position location system 100 does not move, or jump more than a theoretical maximum distance from one data record to the next based upon the maximum attainable speed of the mobile machine, as retrieved from database 126. The maximum attainable physical parameters that may be associated with a mobile machine, and therefore act as restrictions upon the processing performed by controller 124, may include maximum attainable position, velocity, acceleration, heading, wheel speed, steering angle, or orientation, including roll, pitch, and yaw of the machine. Another inhibit condition imposed by controller 124 may include a minimum speed of the mobile machine, below which controller 124 will not provide an updated location for the mobile machine. Additional conditions that may result in restrictions on the processing performed by controller 124 may include a breakdown in communications from any of the sensors, GPS receivers, or POS to each other or to controller 124, a failure to pass an initial accuracy check, or the mobile machine moving too slowly.

When acting as a PIM for an external POS that is providing GNSS and/or integrated GNSS/INS data regarding the position of a mobile machine, controller 124 may fulfill various functions including formatting the data that is provided by different systems, handling coordinate transformations for the data where required, performing position error cross-checking, and following a period of time (often referred to as the debounce time) from when information is first determined to be unreliable, switching from determining the position of the mobile machine using the information that has been determined to be unreliable to determining the position of the mobile machine using dead reckoning (DR). DR may be used after the debounce time to continue to provide the position of the mobile machine as controller 124 commands the machine to come to a stop. In situations where a mobile machine is being autonomously controlled, it may be important to quickly determine when position information is no longer reliable, and then to continue to monitor the position of the machine using techniques such as DR that do not rely upon the unreliable data to bring the machine to a stop until the problem with unreliable information can be resolved.

The controller 124 may also communicate with the various sensors, GPS receivers, POS and the mobile machine itself via one or more communication devices (not shown). The one or more communication devices may embody any mechanism that facilitates the exchange of data between controller 124, the various sources of location and motion information, and the mobile machine. The communication device may include hardware and/or software that enables controller 124 to send and/or receive data messages through a direct data link (not shown) or a wireless communication link. The wireless communications may include, for example, satellite, cellular, infrared, and any other type of wireless communications that enable controller 124 to wirelessly exchange information. Controller 124 may be further configured to send control instructions, via the communication device, to one or more mobile machines to instruct the performance of various functions. Exemplary control instructions may include instructing a machine to go to a desired location, instructing a machine to initiate certain tasks at a worksite, or instructing a machine to slow down or shut down. Exemplary tasks may be associated with altering the geography at a worksite and may include, for example, a hauling operation, a grading operation, a leveling operation, a plowing operation, a bulk material removal operation, or any other type of operation. The control instructions may be different for manned, autonomous, or semi-autonomous machines. For example, control instructions for a manned machine may be provided to an operator visually or audibly by way of a display, speakers, etc. (not shown). Control instructions for autonomous or semi-autonomous machines may be directed to actuation of machine components (e.g., steering, braking, fueling, etc.), and cause autonomous implementation of the instructions. In any machine (autonomous, semi-autonomous, or manned), the controller 124 may be capable of activating a warning device. The warning device may be configured to provide a warning and/or a recommendation to an onboard, offboard, or remote operator when activated.

Controller 124 may be configured to perform an initial accuracy check at the beginning of an autonomous operation of the mobile machine, or after a reset or reboot following correction of problems leading to unreliability of information being received. The initial accuracy check may include various checks on an external computer system for a position and orientation system (POS), such as may be providing GNSS information or integrated GNSS/INS information to position location system 100 through the position interface module (PIM) of processor 124. These checks may include checks that the POS is in a navigation mode, that the POS includes RTK navigation and that a sufficient number of satellites are visible at each of the GPS receivers to provide a high level of precision (referred to as RTK FIXED) at least at the primary GPS receiver, and that the distances between the various sensors and GPS receivers (referred to as lever arm) are within acceptable tolerances.

Figure 2:
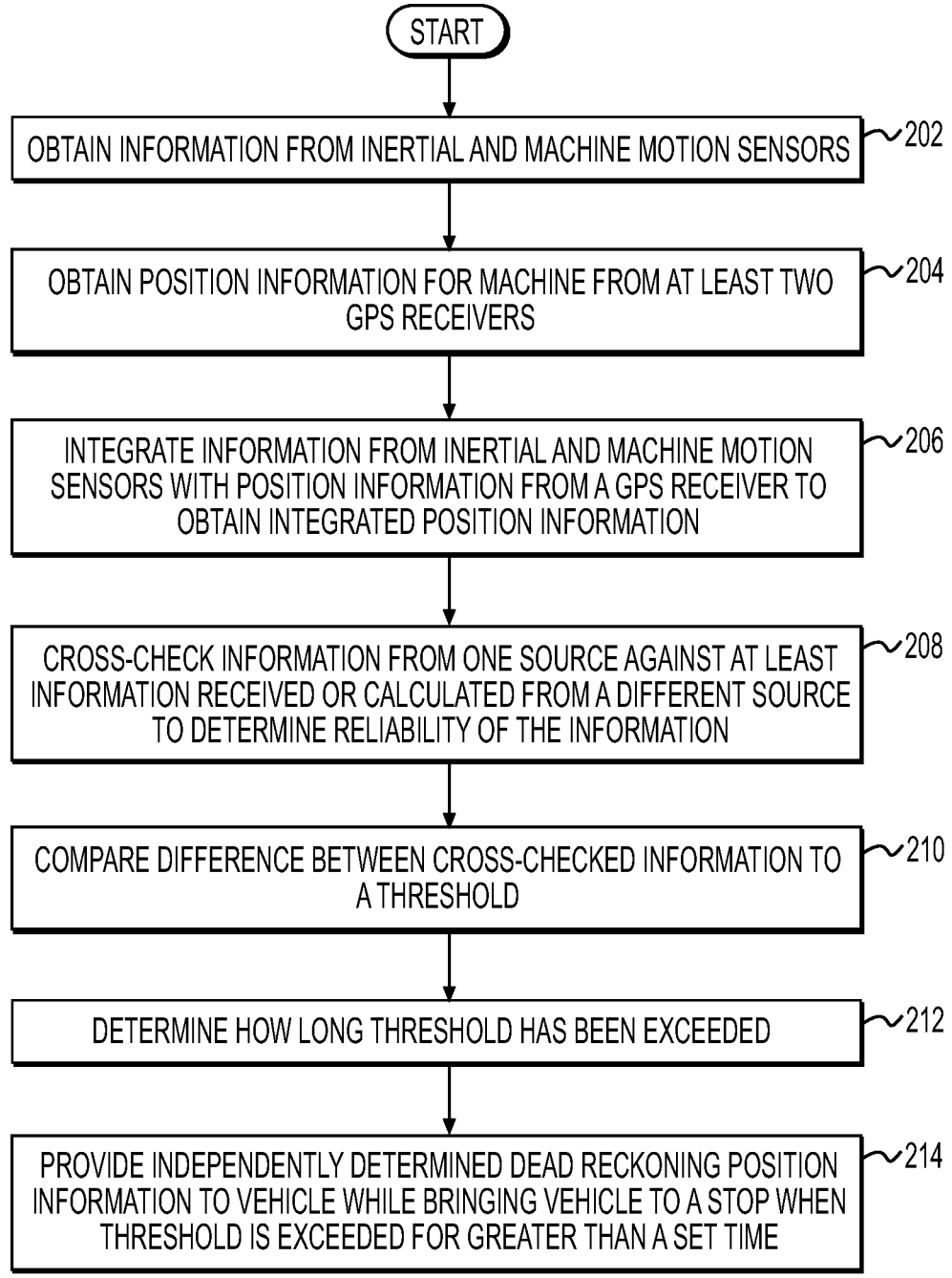
FIG. 2 is a flowchart depicting an exemplary disclosed method that may be performed by the position identification system of FIG. 1.
Figure 3:
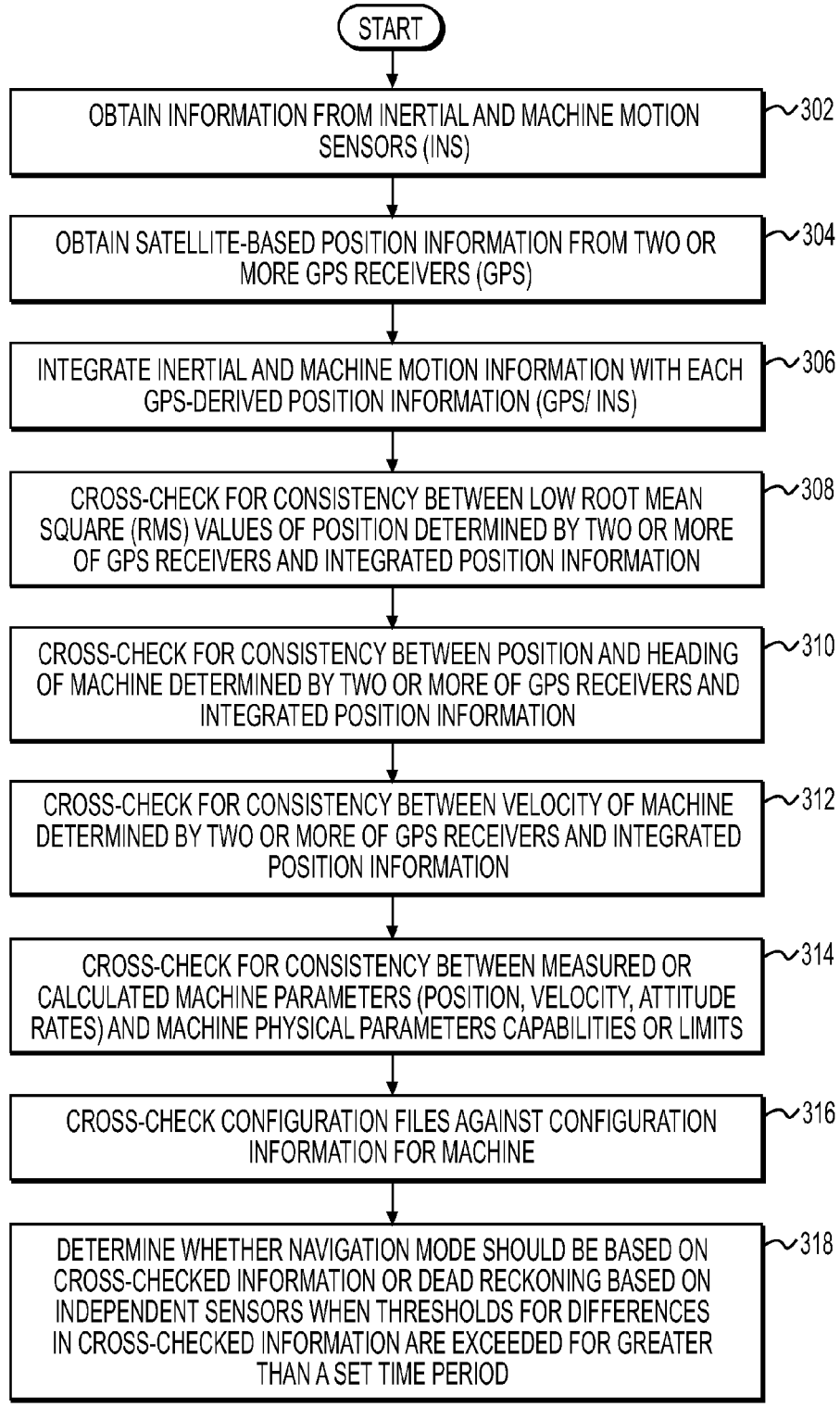
FIG. 3 is a flowchart depicting an exemplary disclosed method that may be performed by the position identification system of FIG. 1.

FIGS. 2 and 3 illustrate exemplary disclosed methods of checking the position of a mobile machine, determining the reliability of the position information, and providing control of the mobile machine when the information is determined to be unreliable. The method steps may be stored as instructions on a non-transitory computer readable medium for execution by controller 124. FIGS. 2 and 3 will be discussed in more detail in the following section to further illustrate the disclosed concepts.

INDUSTRIAL APPLICABILITY

The disclosed position identification system 100 provides a way of cross-checking information that is received from various inertial and machine motion sensors, GPS receivers, and integrated GNSS and INS information. The GNSS and INS information may be provided to position identification system 100 from an external position and orientation system (POS) or from an integration module included with system 100 that integrates data from one or more GPS receivers and inertial and machine motion sensors. The method and system of this disclosure provides multiple cross-checks to ensure that position information used by the system for enabling autonomous or semi-autonomous control of a mobile machine is valid and within a desired accuracy. The multiple cross-checks of received information enable a high degree of confidence in the position information without requiring a large number of redundant sensors and/or GPS receivers.

As shown in FIG. 2, step 202, information may be received at a sensor interface 120 from a plurality of inertial and machine motion sensors 102, 104, 106, 108, 110, 112, 114, and 115. The sensors may be provided individually, as part of position identification system 100, or as part of an external position and orientation system (POS). At step 204, position information for the mobile machine may also be obtained from at least two GPS receivers. The information received from the various inertial and machine motion sensors may then be integrated at step 206 by integration module 122. Alternatively or in addition, integrated GNSS and INS information may be provided to a position interface module (PIM) of controller 124 of position identification system 100 from an external POS.

At step 208, the information received from one data source, such as the integrated GNSS/INS information received from an external POS, may be cross-checked against information received or calculated from a different source, such as GNSS information only, to determine the reliability of the received information. In certain implementations the integrated GNSS/INS information received from an external POS may be provided at a faster rate than information received from a GNSS only source such as GPS receivers 116, 118. Accordingly, dead reckoning (DR) may be performed between the data points received from GPS receivers 116, 118 by extrapolating between the data points using wheel speed information from wheel speed sensor 110 and steering angle or curvature information from steering angle sensor 112. At step 210, the difference between the cross-checked information may be compared to a threshold. The information received from a relevant data source such as a GPS receiver may be further processed to obtain a low root mean square value (RMS) by taking the square root of the average of the squares of the original results. One possible check of the accuracy of the data may include comparing the RMS values received over time for a position solution provided by a GPS receiver in a particular location to a predefined threshold. An allowable variation may also encompass a predefined number of standard deviations from the RMS value.

In order to avoid too many false signals, at step 212, processor 124 may determine how long the threshold value has been exceeded by the differences between the cross-checked information. When the threshold has been exceeded for greater than a set period of time known as the debounce time, corrective action may be taken at step 214. A determination that the differences between the cross-checked information have exceeded the threshold for greater than the debounce time may result in instructions being provided to independently determine position information for the mobile machine using dead reckoning (DR) from a last known good position, a wheel speed, and a steering angle or curvature of travel of the machine. A command may also be issued at this point to bring the vehicle to a stop, with the position of the machine as it is being stopped determined by the DR.

As further illustrated in the flow chart of FIG. 3, a number of different cross-checks may be performed on information received from the various inertial and machine motion sensors, at least one of the GPS receivers, and the integrated GNSS/INS information. These cross-check algorithms may also be stored as executable instructions on computer readable medium for use by controller 124 of position identification system 100.

At step 302, information may be obtained from the various inertial and machine motion sensors. This information may include information that is provided by an inertial navigation system (INS) in conjunction with a global navigation satellite system (GNSS). In various implementations the GNSS/INS integrated data may be produced by sensors and an integration module that are part of the position identification system 100, or that are provided through a position interface module (PIM) of controller 124 from a separate position and orientation system (POS) mounted on the mobile machine. At step 304, satellite-based position information may also be received from two or more GPS receivers. In various alternative implementations, satellite-based information may be received from at least one GPS receiver. The inertial and machine motion information may be integrated with the GPS-derived position information at step 306.

A cross-check may be performed at step 308 to determine consistency of information between the low RMS values of position provided by any two or more of GPS receivers and integrated GNSS/INS information. At step 310, another cross-check may be performed for consistency between position and heading information of a mobile machine determined by any two or more of GPS receivers and integrated GNSS/INS position information. At step 312, a cross-check may be performed for consistency between velocity of the machine as determined by any two or more of GPS receivers and integrated GNSS/INS position information. At step 314, a cross-check may be performed to ensure that measured or calculated machine parameters such as position, velocity, acceleration, heading, wheel speed, steering angle, orientation, or the rates of change of any of these machine parameters does not exceed the machine physical parameters capabilities or limits. As one example, the cross-check may be performed to determine whether the horizontal distance determined at two different times by two subsequent position determinations is within the theoretical distance that the machine could have moved at its maximum velocity in that period of time. At step 316, a cross-check may also be performed between configuration files stored by controller 124 and configuration information for a particular mobile machine that is being monitored. At step 318, a determination may be made on whether the current navigation mode should be based on cross-checked information or on dead reckoning based on independent sensors when thresholds for differences in the cross-checked information are exceeded for greater than a set time period (debounce time).

It will be apparent to those skilled in the art that various modifications and variations can be made to the position identification system of the present disclosure. Other embodiments of the position identification system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for determining the position of a mobile machine, the system comprising:
   at least one motion sensor configured for detecting one or more of changes in position, velocity, acceleration, heading, wheel speed, rotation, steering angle, or orientation of the mobile machine;
   at least one global positioning system (GPS) receiver in addition to said at least one motion sensor, said at least one GPS receiver configured to generate a first location signal indicative of an actual location of the mobile machine;
   an integration module configured to integrate information from said at least one motion sensor and said at least one GPS receiver to generate a second location signal indicative of an actual location of the mobile machine; and
   a controller in communication with the at least one motion sensor, the at least one GPS receiver, and the integration module, the controller being configured to:
     determine the reliability of information received from the at least one motion sensor, the at least one GPS receiver, and the integration module; and
     following a period of time from when received information is first determined to be unreliable, switching from determining the position of the mobile machine using information determined to be unreliable to determining the position of the mobile machine using dead reckoning from a last known good position of the mobile machine, a determined wheel speed of the mobile machine, and a steering command being provided to the mobile machine.

2. The system of claim 1, wherein the controller is configured to determine the reliability of information by cross-checking said first location signal generated by said at least one GPS receiver against said second location signal generated by said integration module.

3. The system of claim 2, wherein the controller is configured to perform the cross-checking by comparing a difference between the first location signal and the second location signal to a threshold value.

4. The system of claim 1, wherein the controller is configured to determine the reliability of information by cross-checking a measurement or a calculation based upon a measurement of each of said at least one motion sensor, said at least one GPS receiver, and said integration module against a measurement or a calculation based upon a measurement of another one of said at least one motion sensor, said at least one GPS receiver, and said integration module.

5. The system of claim 4, wherein the controller is configured to perform the cross-checking by comparing a difference between measurements or calculations based upon measurements of any two of said at least one motion sensor, said at least one GPS receiver, and said integration module to a threshold value.

6. The system of claim 1, wherein the controller is configured to determine the reliability of information by cross-checking at least one of an X coordinate, a Y coordinate, or a Z coordinate determined for a location of the mobile machine by one of said at least one GPS receiver against a corresponding X coordinate, Y coordinate, or Z coordinate determined for the location of the mobile machine by a different one of said at least one GPS receiver or by said integration module.

7. The system of claim 6, wherein the controller is configured to perform the cross-checking by comparing a difference between one or more of the X, Y, and Z coordinates determined by one of said at least one GPS receiver and the corresponding X, Y, and Z coordinates determined by a different one of said at least one GPS receiver or by said integration module to a threshold value.

8. The system of claim 1, wherein the controller is further configured to determine one or more of a maximum attainable physical parameter associated with the mobile machine, the maximum attainable physical parameter being selected from one of position, velocity, acceleration, heading, wheel speed, steering angle, orientation, or a rate of change of any of the physical parameters for the mobile machine.

9. The system of claim 8, wherein the controller is further configured to compare information received from at least two of the at least one motion sensor, the at least one GPS receiver, and the integration module, and determine whether a change in a physical parameter associated with the mobile machine as determined from the received information is greater than a corresponding maximum attainable physical parameter for the mobile machine.

10. The system of claim 1, wherein the controller is configured to determine the reliability of information by checking for consistency between a measurement or a calculation based upon a measurement received from one of the at least one motion sensor, the at least one GPS receiver, or the integration module, and a measurement or a calculation based upon a measurement received from another one of the at least one motion sensor, the at least one GPS receiver, or the integration module.

11. The system of claim 10, wherein the controller is configured to check for consistency between pairs of measurements or calculations based upon measurements of at least one of low root mean square values for position outputs for the mobile machine, headings of the mobile machine, velocities of the mobile machine, orientations of the mobile machine, and initial positions of the mobile machine.

12. A method of checking the position of a mobile machine, the method comprising:
receiving first signals indicative of one or more of changes in position, velocity, acceleration, heading, wheel speed, rotation, steering angle, or orientation of the mobile machine from one or more motion sensors;
receiving second signals indicative of an actual location of the mobile machine from at least one global positioning system (GPS) receiver in addition to said one or more motion sensors;
integrating information from said one or more motion sensors and said at least one GPS receiver using an integration module to generate an integrated location signal indicative of an actual location of the mobile machine;
determining the reliability of information received from the one or more motion sensors, the at least one GPS receiver, and the integration module; and
switching from determining the position of the mobile machine using information determined to be unreliable to determining the position of the mobile machine using dead reckoning from a last known good position of the mobile machine, a determined wheel speed of the mobile machine, and a steering command being provided to the mobile machine following a period of time from when received information is first determined to be unreliable.

13. The method of claim 12, wherein determining the reliability of information includes cross-checking said second signals generated by said at least one GPS receiver against said integrated location signal generated by said integration module.

14. The method of claim 13, wherein the cross-checking is performed by comparing a difference between said second signals and said integrated location signal to a threshold value.

15. The method of claim 12, wherein determining the reliability of information includes cross-checking a measurement or a calculation based upon a measurement of each of said one or more motion sensors, said at least one GPS receiver, and said integration module against a measurement or a calculation based upon a measurement of another one of said one or more motion sensors, said at least one GPS receiver, and said integration module.

16. The method of claim 15, wherein the cross-checking is performed by comparing a difference between measurements or calculations based upon measurements of any two of said one or more motion sensors, said at least one GPS receiver, and said integration module to a threshold value.

17. The method of claim 12, wherein determining the reliability of information includes cross-checking at least one of an X coordinate, a Y coordinate, and a Z coordinate determined for a location of the mobile machine by one of said at least one GPS receiver against a corresponding X coordinate, Y coordinate, or Z coordinate determined for the location of the mobile machine by a different one of said at least one GPS receiver or by said integration module.

18. The method of claim 17, wherein the the cross-checking is performed by comparing a difference between one or more of the X, Y, and Z coordinates determined by one of said at least one GPS receiver and the corresponding X, Y, and Z coordinates determined by a different one of said at least one GPS receiver or by said integration module to a threshold value.

19. The method of claim 12, further including:
determining one or more of a maximum attainable physical parameter associated with the mobile machine, the maximum attainable physical parameter being selected from one of position, velocity, acceleration, heading, wheel speed, steering angle, orientation, or a rate of change of any of the physical parameters for the mobile machine.

20. The method of claim 19, further including:
comparing information received from at least two of the one or more motion sensors, the at least one GPS receiver, and the integration module; and
determining whether a change in a physical parameter associated with the mobile machine as determined from the received information is greater than a corresponding maximum attainable physical parameter for the mobile machine.

21. The method of claim 12, wherein determining the reliability of information includes checking for consistency between pairs of measurements or calculations based upon measurements of at least one of low root mean square values of position outputs for the mobile machine, headings of the mobile machine, velocities of the mobile machine, orientations of the mobile machine, and initial positions of the mobile machine.

22. A non-transitory computer readable medium for use by a system for determining a position of a mobile machine, the non-transitory computer readable medium having executable instructions stored thereon for performing a method of monitoring a position of a base station, the method comprising:
receiving first signals indicative of one or more of changes in position, velocity, acceleration, heading, wheel speed, rotation, steering angle, or orientation of the mobile machine from one or more motion sensors;
receiving second signals indicative of an actual location of the mobile machine from at least one global positioning system (GPS) receiver in addition to said one or more motion sensors;
integrating information from said one or more motion sensors and said at least one GPS receiver using an integration module to generate an integrated location signal indicative of an actual location of the mobile machine;
determining the reliability of information received from the one or more motion sensors, the at least one GPS receiver, and the integration module; and
switching from determining the position of the mobile machine using information determined to be unreliable to determining the position of the mobile machine using dead reckoning from a last known good position of the mobile machine, a determined wheel speed of the mobile machine, and a steering command being provided to the mobile machine following a period of time from when received information is first determined to be unreliable.

* * * * *